(12) United States Patent
Apte et al.

(10) Patent No.: US 8,700,634 B2
(45) Date of Patent: Apr. 15, 2014

(54) EFFICIENT DEDUPLICATED DATA STORAGE WITH TIERED INDEXING

(75) Inventors: Anand Apte, Pune (IN); Jaspreet Singh, Santa Clara, CA (US); Milind Borate, Pune (IN); Shekhar S. Deshkar, Pune (IN)

(73) Assignee: Druva Inc., Mountain View, CA (US)

( * ) Notice: Subject to any disclaimer, the term of this patent is extended or adjusted under 35 U.S.C. 154(b) by 276 days.

(21) Appl. No.: 13/340,434

(22) Filed: Dec. 29, 2011

(65) Prior Publication Data

US 2013/0173627 A1  Jul. 4, 2013

(51) Int. Cl.
*G06F 17/30* (2006.01)

(52) U.S. Cl.
USPC .................. 707/741; 707/814; 707/830

(58) Field of Classification Search
USPC ......... 707/640, 664, 692, 696–697, 741, 814, 707/830
See application file for complete search history.

(56) References Cited

U.S. PATENT DOCUMENTS

| | | | |
|---|---|---|---|
| 7,631,155 B1 * | 12/2009 | Bono et al. | 711/156 |
| 7,672,981 B1 * | 3/2010 | Faibish et al. | 707/999.204 |
| 7,694,191 B1 * | 4/2010 | Bono et al. | 714/48 |
| 7,818,535 B1 * | 10/2010 | Bono et al. | 711/173 |
| 7,925,683 B2 | 4/2011 | Jain et al. | |
| 8,037,345 B1 * | 10/2011 | Iyer et al. | 714/6.12 |
| 8,285,758 B1 * | 10/2012 | Bono et al. | 707/822 |
| 8,452,739 B2 * | 5/2013 | Jain et al. | 707/692 |
| 8,566,371 B1 * | 10/2013 | Bono et al. | 707/822 |
| 2005/0203940 A1 * | 9/2005 | Farrar et al. | 707/102 |
| 2005/0210049 A1 * | 9/2005 | Foster | 707/100 |
| 2008/0005141 A1 * | 1/2008 | Zheng et al. | 707/101 |
| 2008/0120129 A1 * | 5/2008 | Seubert et al. | 705/1 |
| 2009/0307184 A1 * | 12/2009 | Inouye et al. | 707/2 |
| 2010/0161685 A1 | 6/2010 | Jain et al. | |
| 2010/0274772 A1 | 10/2010 | Samuels | |
| 2012/0005171 A1 * | 1/2012 | Anglin et al. | 707/692 |
| 2012/0059800 A1 | 3/2012 | Guo | |
| 2012/0095971 A1 | 4/2012 | Shyam et al. | |
| 2012/0096008 A1 * | 4/2012 | Inouye et al. | 707/743 |
| 2012/0117035 A1 | 5/2012 | Ranade et al. | |
| 2012/0185447 A1 | 7/2012 | Zhang et al. | |
| 2012/0330903 A1 * | 12/2012 | Periyagaram et al. | 707/692 |
| 2013/0086006 A1 * | 4/2013 | Colgrove et al. | 707/692 |
| 2013/0097380 A1 * | 4/2013 | Colgrove et al. | 711/118 |

* cited by examiner

*Primary Examiner* — Hanh Thai

(74) *Attorney, Agent, or Firm* — Fenwick & West LLP

(57) ABSTRACT

A deduplicated data storage system provides high performance storage to heterogeneous clients that connect to it via a communications network. The deduplicated data storage system provides fast access to deduplication data by caching the most frequently accessed deduplication data in a hyperindex. Updates to the non-cached deduplication data are serialized by use of a store queue and hold queue.

23 Claims, 8 Drawing Sheets

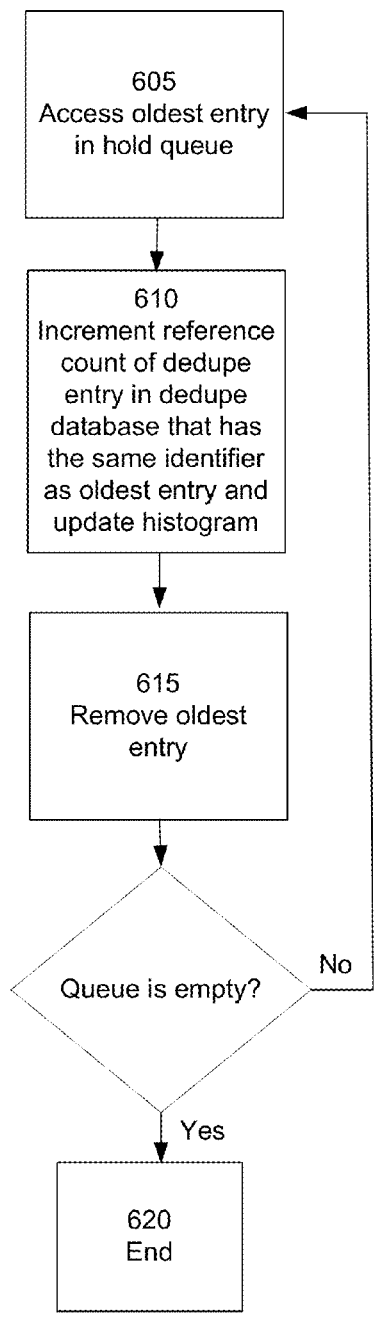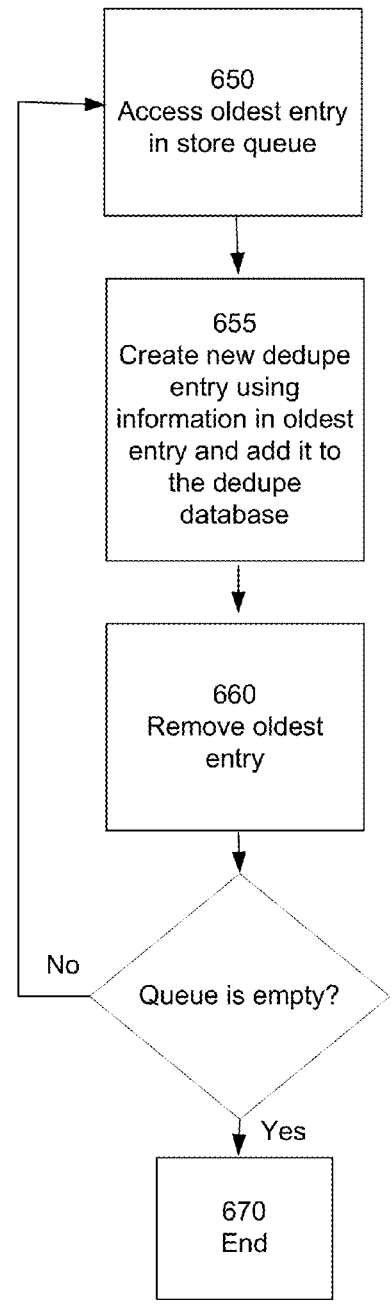
FIG. 6A
FIG. 6B

EFFICIENT DEDUPLICATED DATA STORAGE WITH TIERED INDEXING

BACKGROUND

This disclosure relates generally to data storage systems and, in particular, to deduplicated data backup services.

As computers, smart phones, tablets, laptops, servers, and other electronic devices increase in performance year to year, the data they generate also increases. Although the costs of storage fall every year, the storage needs of many organizations are growing fast enough that these falling costs are negated by rising storage demands. Deduplication of data offers one possible solution to the problem. Deduplication allows duplicate data (including both files and sub-file structures) to be stored only once, but to be accessed by multiple clients. When a deduplicated backup system receives a file that it has stored before in the past, instead of storing that file again, it merely stores a reference to the file in the client's backup directory. When that client requires the backed up file, the deduplicated backup system uses the reference to locate the raw file data, which is then provided to the client. Deduplication can also be performed for sub-file structures, so that even if the entire file is not identical, portions of the file that are identical to past stored data can be stored as references to previously stored data, rather than duplicating the stored data. Deduplication can reduce the storage requirements for an enterprise or individual significantly. However, deduplication requires storage of not only the raw data in files, but also deduplication entries that track the relationship between files and the deduplicated data.

As the volume of stored data increase, so too does the number of deduplication entries required. The storage needs for the deduplication entries alone can grow to the point where it is no longer practical to keep all deduplication entries in fast storage. As a result some deduplication entries must be stored in more plentiful and cheaper slow storage. Storing the deduplication entries in slow storage causes performance degradation as the access time for entries stored in slow storage is much slower than for entries stored in fast storage.

With current technology fast storage is usually implemented using RAM (Random Access Memory) while slow storage is implemented using hard disk drives. There is an order of magnitude difference in access speeds for RAM versus hard disks. Storage management systems that perform deduplication cannot economically fit all deduplication entries in RAM once the stored data grows to the terabyte range. Although storage technologies may change in the future, there will likely remain the same challenge as storage needs will also increase and it will always be more desirable to keep the deduplication entries in the fastest storage available, although the specific technology used for fast and slow storage may change.

BRIEF DESCRIPTION OF THE DRAWINGS

FIG. 6A illustrates one example embodiment of a process used by a hold queue flusher to retire entries in a hold queue.

FIG. 6B illustrates one example embodiment of a process used by a store queue flusher to retire entries in a store queue.

DETAILED DESCRIPTION

Figure 1:
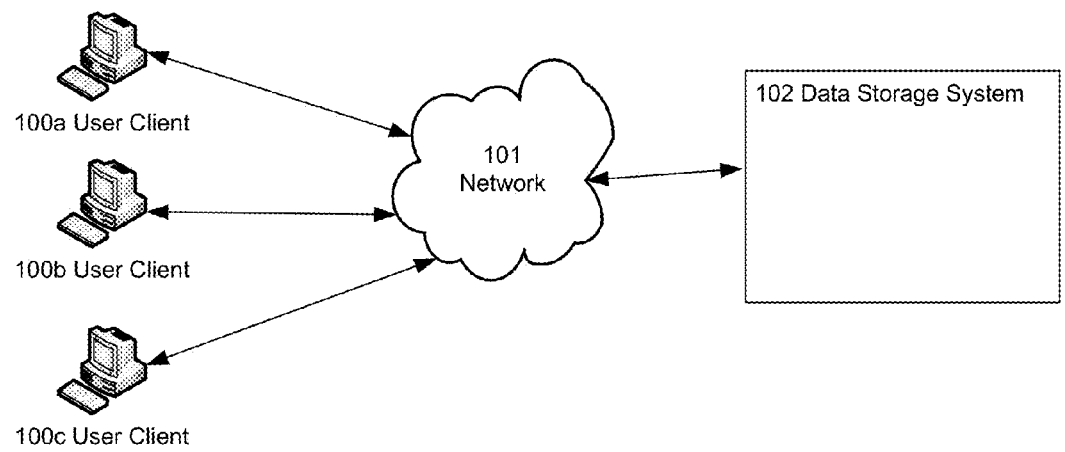
FIG. 1 is a diagram of a deduplicated data storage system with tiered indexing, providing data storage services over a network to user clients, according to one example embodiment.

The figures depict various example embodiments for purposes of illustration only. One skilled in the art will readily recognize from the following discussion that alternative embodiments of the structures and methods illustrated herein may be employed without departing from the principles described herein.

A deduplicated storage system (and method) with tiered indexing provides a reliable and high performance backup service to heterogeneous clients that connect to it via a communications network.

The deduplicated storage system guarantees fast and reliable data storage of large volumes of data without requiring disproportionate quantities of fast storage (such as RAM). Speed and reliability are guaranteed using a system that includes: 1) intelligent indexing of deduplication data that places the most accessed deduplication data in an index stored in fast storage, 2) queuing of updates to minimize random writes, and 3) asynchronous updating of the index in fast storage to minimize the performance impact of update writes.
Configuration Overview One embodiment of a disclosed system, method and computer readable storage medium for an efficient deduplicated storage system includes a computer-implemented method comprising accessing, at a server, a dedupe entry in a dedupe database, where the dedupe database is stored in a first storage. The dedupe entry comprising a reference count and a first checksum, where the first checksum is computed from a block data entry. Then determining if the dedupe entry satisfies an indexing condition, where the indexing condition comprises a comparison of the reference count against a watermark cutoff counter, and responsive to the dedupe entry satisfying the indexing condition, creating a dedupe index entry comprising a copy of the first checksum, and storing the dedupe index entry in a hyperindex, where the hyperindex is stored in a second storage. Then receiving at the server a request from a user client to store user data, the request comprising a second checksum computed from at least a portion of the user data, and the second checksum equal to the first checksum. Then, responsive to receiving the request, locating the dedupe index entry by matching the second checksum to the copy of the first checksum in the dedupe index entry.

Another embodiment comprises a computer for efficient deduplicated storage, where the computer comprises a non-transitory computer-readable storage medium storing executable computer program instructions for accessing a dedupe entry in a dedupe database, where the dedupe database is stored in a first storage. The dedupe entry comprising a reference count and a first checksum, where the first checksum is computed from a block data entry. Then determining if the dedupe entry satisfies an indexing condition, where the indexing condition comprises a comparison of the reference count against a watermark cutoff counter, and responsive to the dedupe entry satisfying the indexing condition, creating a dedupe index entry comprising a copy of the first checksum, and storing the dedupe index entry in a hyperindex, where the hyperindex is stored in a second storage. Then receiving a request from a user client to store user data, the request comprising a second checksum computed from at least a portion of the user data, and the second checksum equal to the first checksum. Then, responsive to receiving the request, locating the dedupe index entry by matching the second checksum to the copy of the first checksum in the dedupe index entry.

System Overview

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

FIG. 1 illustrates one embodiment of a data storage system 102 providing data backup services to user clients 100 over a network 101. A user client 100 may send a request to store a file (or other data) in the data storage system 102. The user client 100 can be any computing device that has data that requires backup. Examples of such a device include a personal computer (PC), a desktop computer, a laptop computer, a notebook, and a tablet PC. Examples also include a device executing an operating system, for example, a MICROSOFT WINDOWS-compatible operating system (OS), APPLE OS X, and/or a LINUX distribution. The user client 100 can also be any device having computer functionality, such as a personal digital assistant (PDA), a mobile telephone, a smartphone, a device executing the APPLE iOS operating system, the ANDROID operating system, WINDOWS MOBILE operating system, or WEBOS operating system. The user client 100 may also be a server device that requires backup, such as a web server (running for example APACHE), a file server, a database server, etc. Although such server devices may perform server functions in an organization, from the point of view of the data storage system 102 they are treated like any other client device that requires data backup services.

The data storage system 102 enables the user client 100 to upload data for backup or storage, and to download data that has been backed up or stored in the past. The data storage system 102 has the capability to deduplicate data such that a user client 100 will not need to upload data to the data storage system 102 if the same data has been uploaded in the past by either the same user client or a different user client. The data storage system 102 may receive a request from a user client 100 to store a file, and determines if the file (or parts of the file) have been stored in the data storage system 102 previously. If the file has not been stored previously, the user client 100 sends the file to the data storage system 102. The data storage system 102 splits the file into smaller block data entries and stores these block data entries in a block data store. The data storage system 102 then computes checksums from the stored block data entries and stores these checksums in a dedupe database. These checksums enable the data storage system 102 to quickly identify that the data is already stored in the system should another client (or the same client) request to store the same data (or a part of the same data) again. If a request to store the same data is received from a new user client 100, the data storage system 102 creates a reference to the already stored data for the new user client 100. This process is described in more detail herein. In one embodiment the data storage system 102 may be implemented using one or more computer servers that have a network communications capability. In another embodiment the data storage system 102 is implemented using cloud services such as AMAZON WEB SERVICES or MICROSOFT AZURE.

The interactions between the user client 100 and the data storage system 102 are typically performed via a network 101, for example, via the internet. The network 101 enables communications between the user client 100 and the data storage system 102. In one embodiment, the network 101 uses standard communications technologies and/or protocols. Thus, the network 101 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 101 can also include links to other networks such as the Internet.

Example System Details

Figure 2:
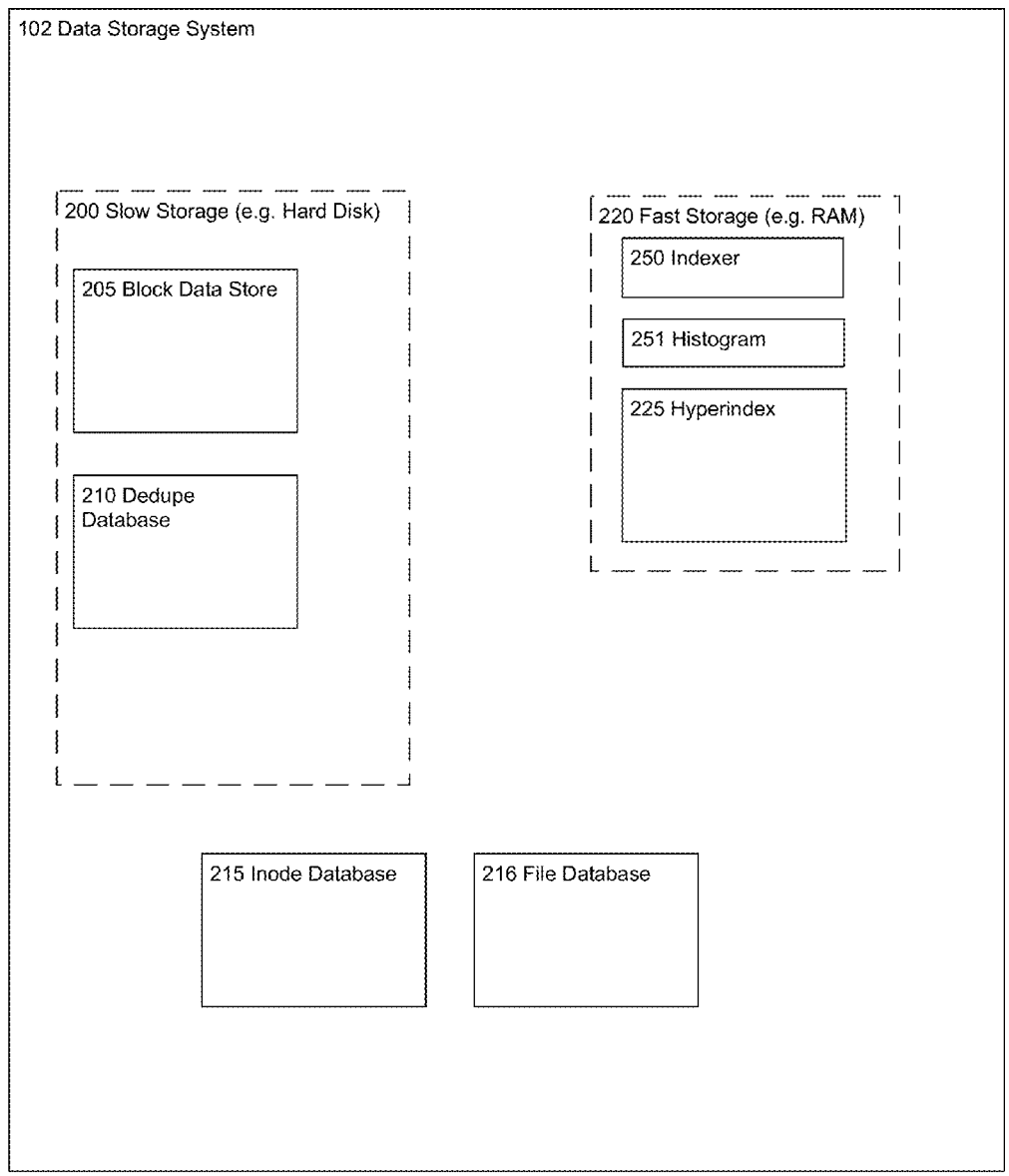
FIG. 2 is a diagram of a system architecture of a deduplicated data storage system with tiered indexing, according to one example embodiment.

FIG. 2 illustrates one embodiment of a system for providing efficient deduplicated data storage to clients. The data storage system 102 is a distributed network service that can provide remote backup services to large numbers of clients over a network 101. The data storage system 102 provides two types of storage media: the fast storage 220 (e.g. this may be implemented with RAM), and the slow storage 200 (e.g. this may be implemented with a hard disk or solid state drive). The difference between the fast storage 220 and the slow storage 200 is that the fast storage tends to provide quicker access to data, but has smaller storage capacity. In practice the fast storage 220 may also be more expensive per unit storage than the slow storage 200. In the future new technology may replace RAM as fast storage and hard disks/solid state drives as slow storage. For example, when RAM becomes cheap enough, the slow storage 200 may itself be implemented in RAM, while the fast storage 220 is implemented using even faster technology. In another embodiment, solid state drives or flash memory with superior access speed may be used as the fast storage, while some larger volume storage technology, such as hard disks, may be used as the slow storage.

The fast storage 220 includes the indexer 250, the histogram 251, and the hyperindex 225. The slow storage 200 includes the block data store 205 and the dedupe database 210. In practice the entities shown in fast storage 220 and slow storage 200 may be scattered across more than one computer system. For example, in one embodiment the block data store 205 may be implemented via a structured storage system that spans several storage servers, and thus the data in the block data store 205 may be scattered across many hard drives in a data center. Similarly the hyperindex 225 may be split into fragments that are stored in the RAM of several different storage servers. In one embodiment the slow storage 200 is itself implemented using a RAM-disk.

The block data store 205 contains the raw data received from the user clients 100. This data may be stored in flat files or it may be stored in a structured data storage system or relational database system. The data contained in the block data store 205 may be compressed and/or encrypted. The raw data uploaded by user clients can include any data that clients may want to backup including files, disk images, emails, virtual machine images, etc. The dedupe database 210 contains the bookkeeping data necessary to provide deduplication of the data stored in the block data store 205. Both the block data store 205 and the dedupe database 210 are discussed in more detail herein.

The hyperindex 225 contains data that enables fast access to data from the dedupe database 210. The indexer 250 is a module that is used in the process of selecting data from the dedupe database 210 for placement in the hyperindex 225. The histogram 251 contains statistics about the references to data in the dedupe database 210, and is also used in the process of selecting data for placement in the hyperindex. The hyperindex 225, the indexer 250, and the histogram 251 are described in more detail herein.

The inode database 215 and the file database 216 contain data that tracks the relationship between the data stored in the block data store 205 and the individual files and directories stored by the user clients 100. The inode database 215 and file database 216 are described in more detail herein.

Example Data Structures

Figure 3:
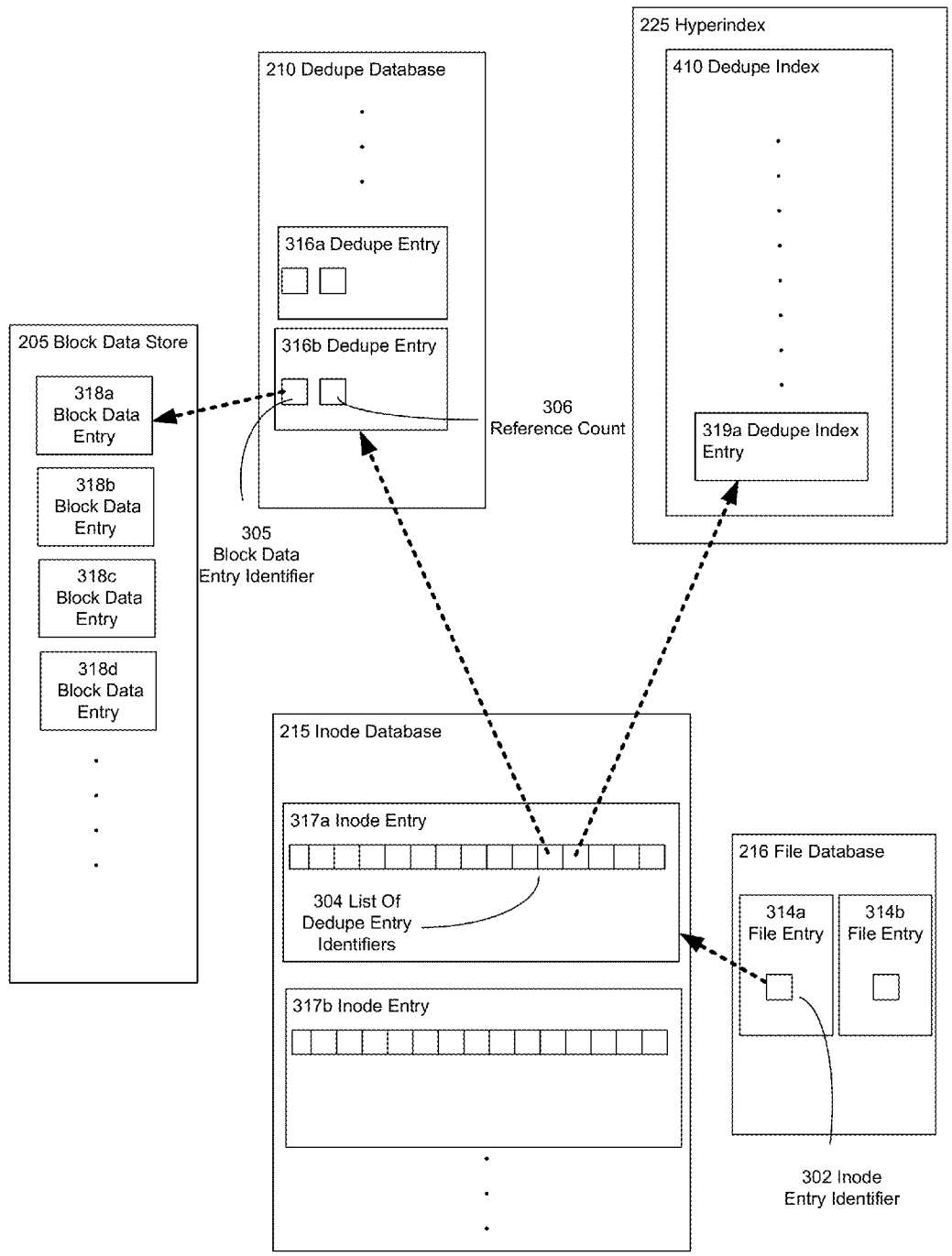
FIG. 3 is a diagram showing the internal architecture of a hyperindex, according to one example embodiment.

FIG. 3 illustrates the structure and relationship between the data entities in the data storage system 102. The data storage system 102 may include four conceptually distinct types of data stores: the file databases 216, the inode database 215, the dedupe database 210, and the block data store 205. These databases may be implemented using any structured data storage system (e.g. MYSQL, APACHE CASSANDRA, etc.). The dedupe index 410 is a part of the hyperindex 225 and contains a partial index of the data in the dedupe database 210.

In practice the dedupe database 210 and the block data store 205 are stored in the slow storage 200, while the hyperindex 225 and dedupe index 410 are stored in fast storage 220. The inode database 215 and the file database 216 are also often stored in fast storage 220, although they may also be stored in slow storage 200.

The file database 216 contains information about the files (user data) stored by a user client 100. There may be multiple file databases 216, one for each user client 100 whose files are stored by the data storage system 102. A file database 216 contains file entries 314, which contain information about the files stored by a user client 100. The file entries 314 contain information such as file name, file version etc. The file entries 314 also each contain an inode entry identifier 302 that identifies an inode entry 317 that contains information regarding the deduplication data for the file corresponding to the file entry 314.

The inode entries 317 are stored in an inode database 215. Each file entry 314 contains the identifier of a single inode entry 317. Each inode entry 317 contains metadata pertaining to the file associated with the file entry 314 that refers to it. The metadata may include information such as file size, file name, etc., but it also contains a list of dedupe entry identifiers 304 that identify one or more dedupe entries 316 and include offsets for these entries.

The dedupe entries 316 store metadata pertaining to the raw data from the user client 100 stored in the data storage system 102. The dedupe entries 316 are stored in the dedupe database 210. Each dedupe entry 316 contains a block data entry identifier 305 that identifies a block data entry 318 in the block data store 205 (this is stored data that was uploaded by a user client), as well as a reference count 306 (also called refcount) that tracks the number of inode entries 317 that refer to it (a reference in this context meaning that the inode entry contains an identifier for that dedupe entry in its list of dedupe entry identifiers). Each dedupe entry 316 may also contain a block data checksum (hash) for the data that is stored in the corresponding block data entry 318, a dedupe entry identifier for itself, and a timestamp that records the time that dedupe entry 316 was last accessed.

The dedupe index 410 is part of the hyperindex 225 and resides in the fast storage 220. The dedupe index 410 contains dedupe index entries 319. Each dedupe index entry 319 contains a subset of the information in a dedupe entry. In one embodiment the dedupe index entries 319 contain only the dedupe entry identifier and the block data checksum from the dedupe entries. In practice the hyperindex 225 may contain multiple dedupe indices 410, with each dedupe index storing a particular sub-range of dedupe index entries 319. Only a subset of the dedupe entries 316 in the dedupe database 210 have related dedupe index entries 319 in the dedupe indices 410. The dedupe index entries 319 contain the data of only the dedupe entries 316 that are predicted to be most often accessed. The process of selecting dedupe entries 316 for representation in the dedupe indices 410 is described in more detail herein.

The dedupe index 410 may be arranged such that the dedupe index entries 319 are sorted by either the block data checksum or the dedupe entry identifier, or both. Thus when the data storage system 102 needs to quickly determine whether block data with a given checksum is stored in the hyperindex, the system can efficiently search the dedupe indices 410 to discover if a dedupe index entry 319 with that checksum is present.

The block data entry 318 is stored in the block data store 205. Each block data entry 318 contains a block of raw data from a file stored by a user client 100.

Hyperindex

Figure 4:
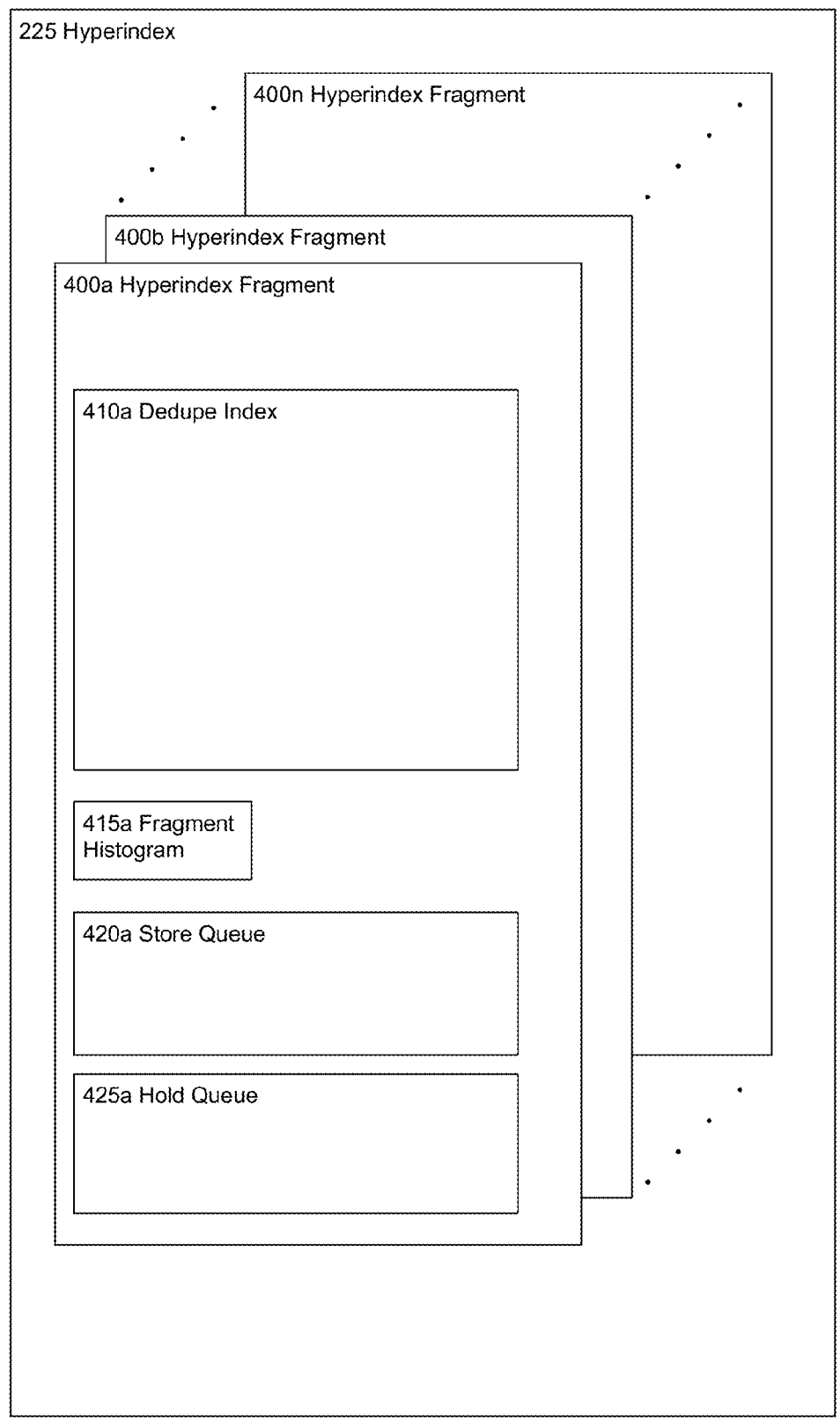
FIG. 4 illustrates the linkages between various data objects in a data storage system with tiered indexing, according to one example embodiment.

The hyperindex 225 contains both the indexed data from the dedupe database 210 and the information that enables the data storage system 102 to select the best data to index in the dedupe indices 410. FIG. 4 illustrates one embodiment of the hyperindex 225. The hyperindex 225 includes one or more hyperindex fragments 400.

Each hyperindex fragment 400 contains a dedupe index 410, a fragment histogram 415, a store queue 420, and a hold queue 425. The hyperindex fragments 400 may be stored in the fast storage 220 of a single computer server, or they may be scattered across the fast storage 220 of several different computer servers connected by the network 101. In the case where the data storage system 102 is implemented using a cloud service, the hyperindex fragments may be distributed across many virtual machines executing in the cloud infrastructure. Each hyperindex fragment 400 contains the data related to dedupe entries 316 in a particular sub-range, including a dedupe index 410 that contains the dedupe index entries 319 for the range. Taken together the hyperindex fragments 400 cover the entire range of dedupe entries 316 in the dedupe database 210. However, since the hyperindex fragments 400 are stored in fast storage 220, while the dedupe database 210 is in slow storage 200, the dedupe indices 410 in the hyperindex fragments 400 will not typically contain all dedupe entries 316 from the sub-range that they cover, but instead will index only a select subset of dedupe entries 316 in the sub-range that are predicted to be most likely to be accessed by the system. The process of selecting dedupe entries 316 for indexing in the dedupe indices 410 is discussed in more detail herein.

The division of the dedupe entries 316 into sub-ranges that are monitored and indexed by each hyperindex fragment 400 can be done in various ways. In one embodiment the dedupe entries 316 are divided into sub-ranges based on the numerical value of their block data checksums. In another embodiment the division into sub-ranges is done based on the dedupe entry identifiers of the dedupe entries 316. It is possible for the hyperindex 225 to have only a single hyperindex fragment 400, in which case that single fragment would be responsible for indexing select dedupe entries 316 from the entire range of the dedupe database 210.

The histogram 251 consists of a list of numbers that correspond to the number of dedupe entries 316 that have reference counts of various values. For example, in the histogram 251, the number at the $0^{th}$ position in the list consists of the number of dedupe entries 316 that have a reference count of 0 (i.e. no inode entries 317 refer to them). The $1^{st}$ position in the list is a value indicating the number of dedupe entries 316 having one reference. The $2^{nd}$ position in the list contains a value indicating the number of dedupe entries 316 having two references, etc. The histogram 251 tracks the statistics for all the dedupe entries 316 in the entire dedupe database 210, while the fragment histograms 415 track the statistics for the dedupe entries 316 that fall within the range covered by their parent hyperindex fragments 400. The histogram 251 is obtained by adding together the fragment histograms 415. For example, the $0^{th}$ element of the histogram 251 is equal to the sum of all the $0^{th}$ elements of the fragment histograms 415. The $1^{st}$ element of the histogram 251 is equal to the sum of all the $1^{st}$ elements of the fragment histograms 415, etc. The histogram 251 is used in the process of selection of dedupe entries 316 for indexing that is described in more detail herein.

A store queue 420 is a first-in-first-out (FIFO) queue containing data entries that will be used to create new dedupe entries 316 in the dedupe database 210. The data entries in a store queue 420 each contain a block data checksum, dedupe entry identifier, and a block data entry identifier that will be used when instantiating a new dedupe entry 316. The purpose of a store queue 420 is to serialize updates to the dedupe database 210, so that asynchronous writes do not slow the performance of that database. The store queue 420 is discussed in more detail herein.

A hold queue 425 is a FIFO queue containing updates to the reference counts of existing dedupe entries 316, and to the histograms 415. Each data entry (hold queue entry) in a hold queue 425 consists of a dedupe entry identifier. This identifier is used to identify a dedupe entry 316 in the dedupe database 210 that will have its reference count incremented.

Data Storage Process

Figure 5:
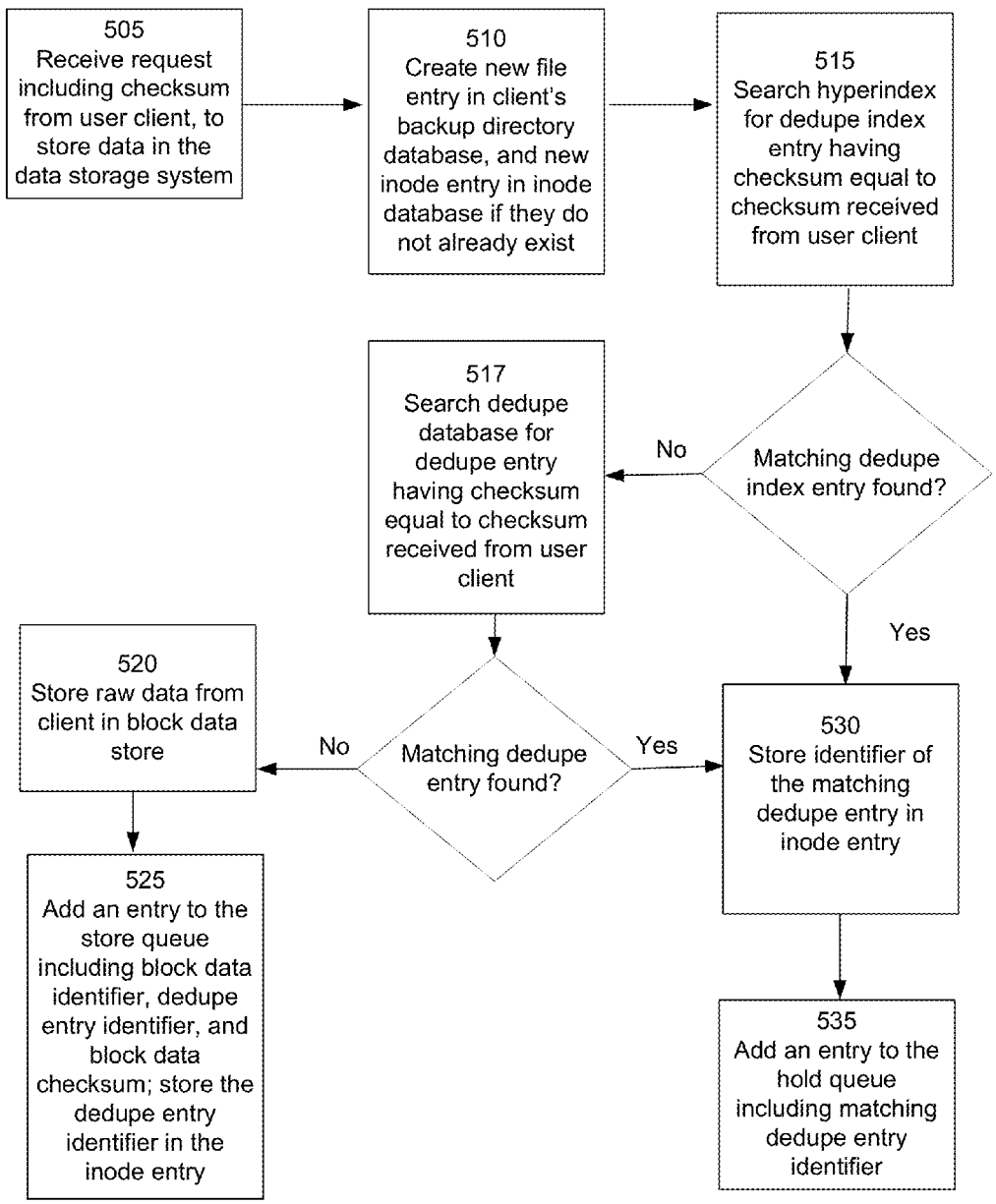
FIG. 5 illustrates one example embodiment of a process used by a data storage system with tiered indexing, to receive and store new data from a user client.

FIG. 5 illustrates one embodiment of an example process used by the data storage system 102 to receive and store data from a user client 100, in a way that prevents the storage of duplicate data.

The process begins when the data storage system 102 receives 505 a request to store data that includes one or more checksums from the user client 100. The checksum or checksums are computed from data that the user client 100 wishes to store in the data storage system 102. The number of checksums will depend on how large the data is. A file that is very small may require only a single checksum, while larger files may require multiple checksums. The checksums are signatures that uniquely identify the data. Checksums may be computed from the user client's raw data using hash functions such as, for example, SHA-1.

When the data storage system 102 receives a checksum with a request to store new data (e.g., data that is part of a file), the service may create 510 a new file entry 314 in the user client's file database 216, if a file entry 314 does not already exist for that file in the file database 216. If the user client 100 has not interacted with the data storage system 102 in the past, a file database 216 may also need to be created for the client before the file entry 314 is created. Once the file entry 314 is created, an inode entry 317 is created for that file entry 314 (if one does not already exist) in the inode database 215. The inode entry's identifier is stored in the file entry 314 so that the file entry has a reference to its inode entry.

The dedupe database 210 contains a list of dedupe entries 316 that contain information—including block data checksums—for each piece of data uploaded to data storage system 102 by any user client 100. The most referenced dedupe entries are indexed in the hyperindex 225 as dedupe index entries 319. The data storage system 102 first searches 515 the hyperindex 225 for a dedupe index entry 319 that has a block data checksum equal to the checksum received in the storage request from the user client 100. If a matching dedupe index entry 319 is found, it means that the same data has been uploaded to the data storage system 102 previously, and the same data need not be stored again. In that case the dedupe identifier of the dedupe entry 316, corresponding to the matched dedupe index entry 319, is stored 530 in the inode entry. Once this is done a new entry is added 535 into a hold queue 425. The new entry includes a dedupe entry identifier that will later be used to update a reference count for a dedupe entry 316 in the dedupe database 210, and to update the fragment histogram 415 for the hyperindex fragment 400 that the matching dedupe index entry 319 was found in. The processing of entries in a hold queue 425 is discussed in more detail herein.

If a matching dedupe index entry 319 is not found in the hyperindex 225, then the data storage system 102 directly searches 517 the dedupe database 210 for a dedupe entry 316 containing a block data checksum equal to the checksum received in the request. If a matching dedupe entry is found, then the data storage system 102 stores 530 a reference to the matching dedupe entry in the inode entry and adds 535 an entry to a hold queue.

If a matching dedupe entry 316 is not found in the dedupe database 210 then it means that the data storage system 102 has not previously stored the data that the user client 100 wishes to store. In this case the system stores 520 the raw data from the user client 100 in a new block data entry 318 in the block data store 205 and then adds 525 an entry into a store queue 420. The store queue entry includes the identifier of the stored block data entry 318, a new dedupe entry identifier, and the checksum of the raw data (which is also the checksum of the block data entry 318). This information is used later to generate a new dedupe entry 316 that is stored in the dedupe database 210. The new dedupe identifier is added in the inode entry. The processing of the entries in the store queue 420 is discussed in more detail herein.

Processing a Hold Queue

FIG. 6A illustrates one embodiment of an example process used by the data storage system 102 to process the entries in a hold queue 425. A hold queue 425 contains a list of entries that each contain an identifier of a dedupe entry 316 in the dedupe database 210 that must have its reference count incremented. A hold queue 425 is processed as a first-in-first-out (FIFO) list. The oldest entry in the hold queue is accessed 605 first. The dedupe database 210 is searched for a dedupe entry 316 having the same identifier as that stored in the oldest entry of the hold queue. When this dedupe entry 316 is located, its reference count is incremented 610, and the histogram 415 of the parent hyperindex fragment 400 of the hold queue 425 is also updated.

The histogram 415 may be updated in different ways. As discussed herein, the histogram 415 consists of a list of numbers, where the $i^{th}$ element in the list corresponds to the number of dedupe entries that have reference count i, in the range covered by the parent hyperindex fragment 400. In one example embodiment, the histogram 415 is updated by decrementing the element of the histogram 415 at the index that is equal to the old reference count of the identified dedupe entry, and incrementing the element of the histogram 415 at the index that is equal to the new reference count of the identified dedupe entry. This operation essentially reduces the statistic for dedupe entries with the old reference count by one, and increases the statistic for dedupe entries with the new reference count by one.

Once the update is completed the oldest entry in the hold queue 425 is removed 615, and if the queue is empty, then the process is ended 620. If the queue is not empty, the process is continued by accessing 605 the next oldest entry in the hold queue 425.

Processing a Store Queue

FIG. 6B illustrates one embodiment of an example process used by the data storage system 102 to process the entries in a store queue 420. A store queue 420 contains a list of entries that each contain an identifier for a new dedupe entry that has not yet been stored in the dedupe database 210, a checksum that has been computed from raw data that has been stored in the block data entry 318 for that new dedupe entry, and an identifier of that block data entry 318 in the block data store 205. A store queue 420 is processed as a FIFO list. The oldest entry in the store queue is accessed 650 first. The information in the oldest entry (i.e. the dedupe entry identifier, checksum, and identifier of the block data entry) are used to create 655 a new dedupe entry 316 that is added to the dedupe database. As part of adding this dedupe entry 316 to the dedupe database 210, a histogram 415 may be updated as well by incrementing the element in the histogram 415 that corresponds to the new dedupe entry's reference count. Once this is done, the oldest entry is removed 660, and if the store queue is empty, the process is ended 670. If the store queue is not empty, the next oldest entry is then accessed 650 and the process is repeated.

The Indexer

The indexer 250 is a module that is used to determine if a dedupe entry 316 meets the minimum conditions necessary to be indexed in the hyperindex 225. A dedupe entry 316 may need to meet one or more conditions before it can be selected for indexing. These conditions are known collectively as the indexing condition. The indexing condition may have one or more sub-condition. For example, for one sub-condition the indexer 250 may include a watermark cutoff counter that indicates the minimum reference count that a dedupe entry 316 must have before it will be indexed in the hyperindex 225. The watermark cutoff counter is determined based on the available space in the fast storage 220 (e.g., available space in the RAM of the computer system that the data storage system 102 operates on), as well as the distribution of reference counts in the histogram 251. In order to determine the watermark cutoff counter the data storage system 102 first determines the available storage (S) and the storage space required for each dedupe index entry 319 (D). Dividing S by D gives the total number of dedupe entries that can theoretically be indexed in the hyperindex 225. This theoretical number may be reduced because of practical concerns to give a more pragmatic target number (T). To determine the watermark cutoff counter (W), the system determines a reference count number for which there are no more than T dedupe entries 316 with that reference count or more than that reference count. W is this reference count number.

The histogram 251 enables the data storage system 102 to quickly ascertain the number of dedupe entries 316 that have reference counts equal or more than a particular value. For example, if the system wishes to calculate the number of dedupe entries 316 that have reference counts 5 or more in the dedupe database 210, it can simply total the values in the histograms 251 from the $5^{th}$ entry to the end of the list to obtain the number of dedupe entries 316 in the dedupe database 210 that have a reference count of 5 or more. To determine W, the system simply has to determine the reference count for which this total is close as possible to T without going over. Assuming H(x) is the $x^{th}$ entry of the histogram (i.e., the number of dedupe entries with reference count x) and maxref is the largest reference count (i.e. last entry in the histogram) then W can be expressed mathematically as follows: W=x s.t. $\Sigma_x^{maxref} H(x) \leq T$.

In some cases it will not be possible to find an x such that $\Sigma_x^{maxref} H(x)$ is close to T without going over T. In this case, using just the watermark cutoff counter as the sole sub-condition for determining whether a dedupe entry 316 should be indexed will be insufficient since using that criteria alone will lead to an under-populated index. To ameliorate this situation, the indexer 250 may include another sub-condition in the indexing condition based on the time of the most recent access of the dedupe entry being evaluated for indexing. In this sub-condition, any dedupe entry with reference count greater than or equal to W will be selected for indexing as usual, but those entries with reference count W−1 may also be selected for indexing if they have been accessed within a specified time limit.

Indexing Process

As mentioned previously, the dedupe database 210 typically contains far too much data to fit in the fast storage 220. The dedupe database 210 is therefore maintained in the slow storage 200, while the most frequently accessed dedupe entries 316 are indexed as dedupe index entries 319 in the dedupe indices 410 of the hyperindex 225. The hyperindex 225 is small enough to entirely fit in the fast storage 220 but it can only accommodate those dedupe entries 316 that have a reference count that is at least W (watermark cutoff counter), or that have a reference count of W−1 and have been recently accessed. In other words, the hyperindex 225 stores only the most referenced and most recently referenced dedupe entries 316 in the dedupe database 210.

Figure 7:
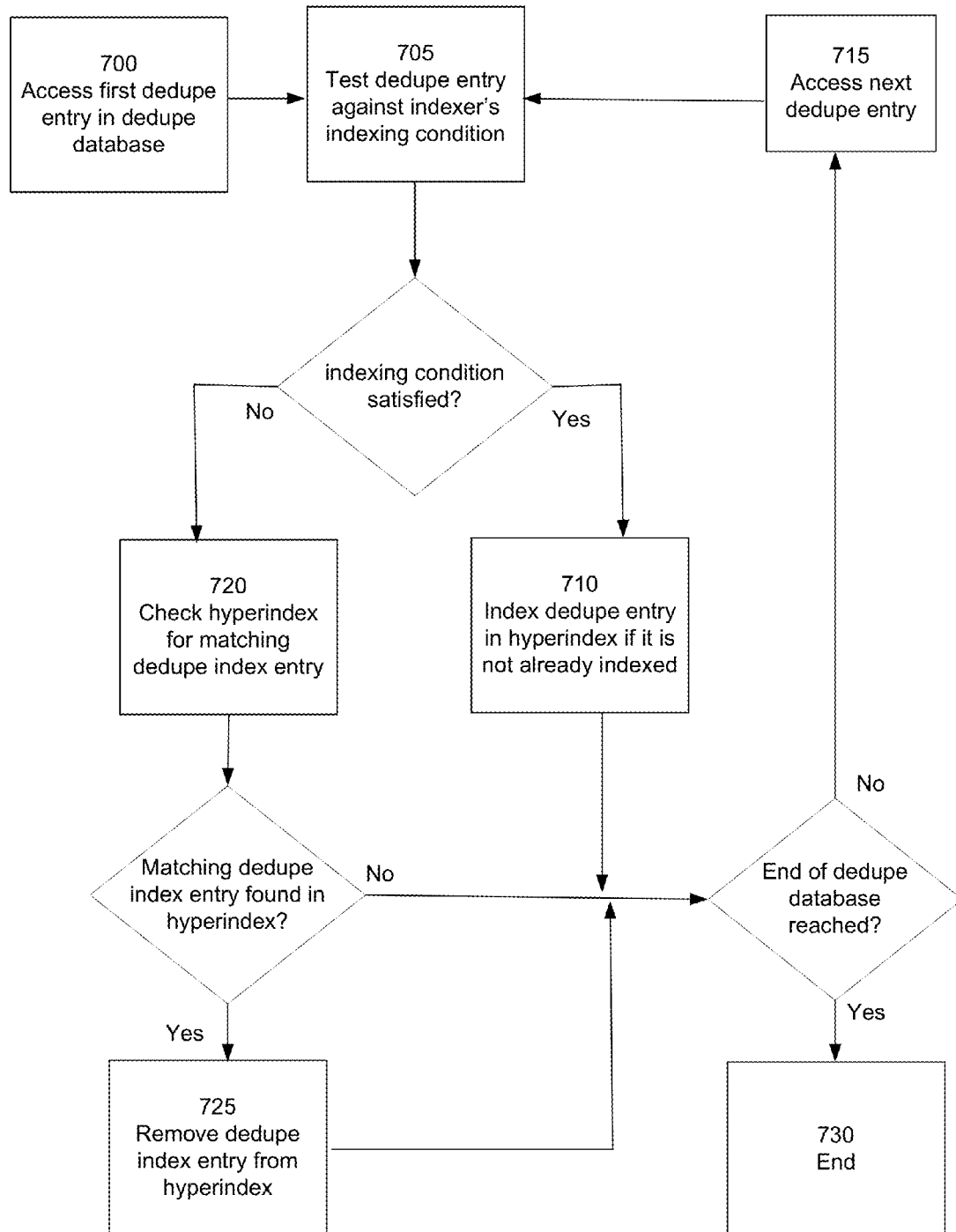
FIG. 7 illustrates one example embodiment of a process for flushing and repopulating a hyperindex.

FIG. 7 illustrates an example embodiment of a process for selecting dedupe entries 316 for indexing in the hyperindex 225, and removing dedupe index entries 319 from the hyperindex 225 when the corresponding dedupe entries no longer satisfy the indexing condition. The data storage system 102 accesses 700 the first dedupe entry in the dedupe database 210. It then tests 705 the first dedupe entry in the dedupe database 210 against the indexer's indexing condition. The indexing condition includes at least one sub-condition. In one embodiment the indexing condition has two sub-conditions; one sub-condition checks if the reference count of the dedupe entry is greater than or equal to the watermark; the other sub-condition checks if the reference count is one less than the watermark and the dedupe entry has been accessed recently. If either of these sub-conditions is met then the indexing condition is considered satisfied and the dedupe entry is indexed 710 in the hyperindex 225 (assuming it is not already in the hyperindex). Indexing of the dedupe entry in the hyperindex 225 is done by creating a dedupe index entry 319 in the dedupe index 410 of one of the hyperindex fragments 400 in the hyperindex 225. The dedupe index entry 319 does not store all the information that is in the dedupe entry 316. A dedupe index entry 319 that is created to index a particular dedupe entry 316 may store only a copy of the block data checksum and the dedupe entry identifier from the dedupe entry 316. Once the dedupe index entry 319 is stored in the hyperindex 225, the system will check if the end of the dedupe database 210 has been reached. If the end of the database has been reached the process ends 730; otherwise the system will access the next dedupe entry 316 in the dedupe database 210, and the process continues.

If the indexing condition is not satisfied by the accessed dedupe entry 316 in the dedupe database 210, then the system will check 720 the hyperindex 225 for a matching dedupe index entry 319 having the same identifier as the dedupe entry 316 being accessed. If such a matching dedupe index entry 319 is not found, then the process continues by accessing 715 the next dedupe entry in the dedupe database 210, or ending 730 if the end of the database has been reached. If a matching dedupe index entry 319 is found in the hyperindex 225, then that dedupe index entry is removed 725 from the hyperindex 225 and the process continues as described above.

Data Retrieval

In order to retrieve data previously stored on the data storage system 102, a user client 100 sends a request to the system. On receiving the request the data storage system 102 locates the file database 216 related to that user client 100. Once the file database 216 is located, the system will locate the file entry 314 corresponding to the requested data. The file entry 314 contains an identifier of an inode entry; the identifier can be used to locate an inode entry 317, which in turn contains a list of identifiers 304 of dedupe entries 316 and corresponding offsets for these dedupe entries. The data storage system 102 locates each dedupe entry 316 that pertains to the data using the identifiers in the list 304. The data storage system 102 then retrieves the block data stored in the block data entries 318 using the block data entry identifiers 305 in each dedupe entry 316. The requested data is comprised of this block data. Using the offset information in the inode entry 317, the data storage system 102 then sends an ordered list of block data to the user client 100. The user client 100 receives the ordered list of data blocks and reconstructs the backed up file by appending this data in order.

The disclosed embodiments allow users to provide data storage services to networked client devices using fewer resources than prior methods. By deduplicating the data that is stored by the client devices, the data storage system 102 avoids repetitive storage. In many use cases this reduces the amount of data that needs to be stored by ten times or more. In some instances, such as where organizations utilize many duplicates of the same documents, the storage used can be hundreds or even thousands of times less than for storage systems that lack deduplication. By using tiered indexing the data storage system 102 can eliminate the slow response times for data retrieval that is common in prior art storage systems. The tiered indexing allows the data storage system 102 to provide the most frequently accessed data to users in an accelerated manner, by keeping such data in fast storage.

Additional Considerations

The above description describes in several places the creation of references to data objects, such as the reference to the dedupe entries 316 stored in the list 304 in the inode entries 317, or the reference 305 to the block data entries 318 contained in the dedupe entry 316. In practice these references can be created by associating a unique identifier with the referenced data object and storing this identifier in the referrer. For example, the list of references to dedupe entries 304 in the inode entry 317 may be a list of dedupe entry identifiers. Similarly, the reference to the block data entry 305 in the dedupe entry 316 may be a block data entry identifier.

Some portions of the above description describe the embodiments in terms of algorithmic processes or operations, for example, as set forth with respect to FIGS. 5-7. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Figure 8:
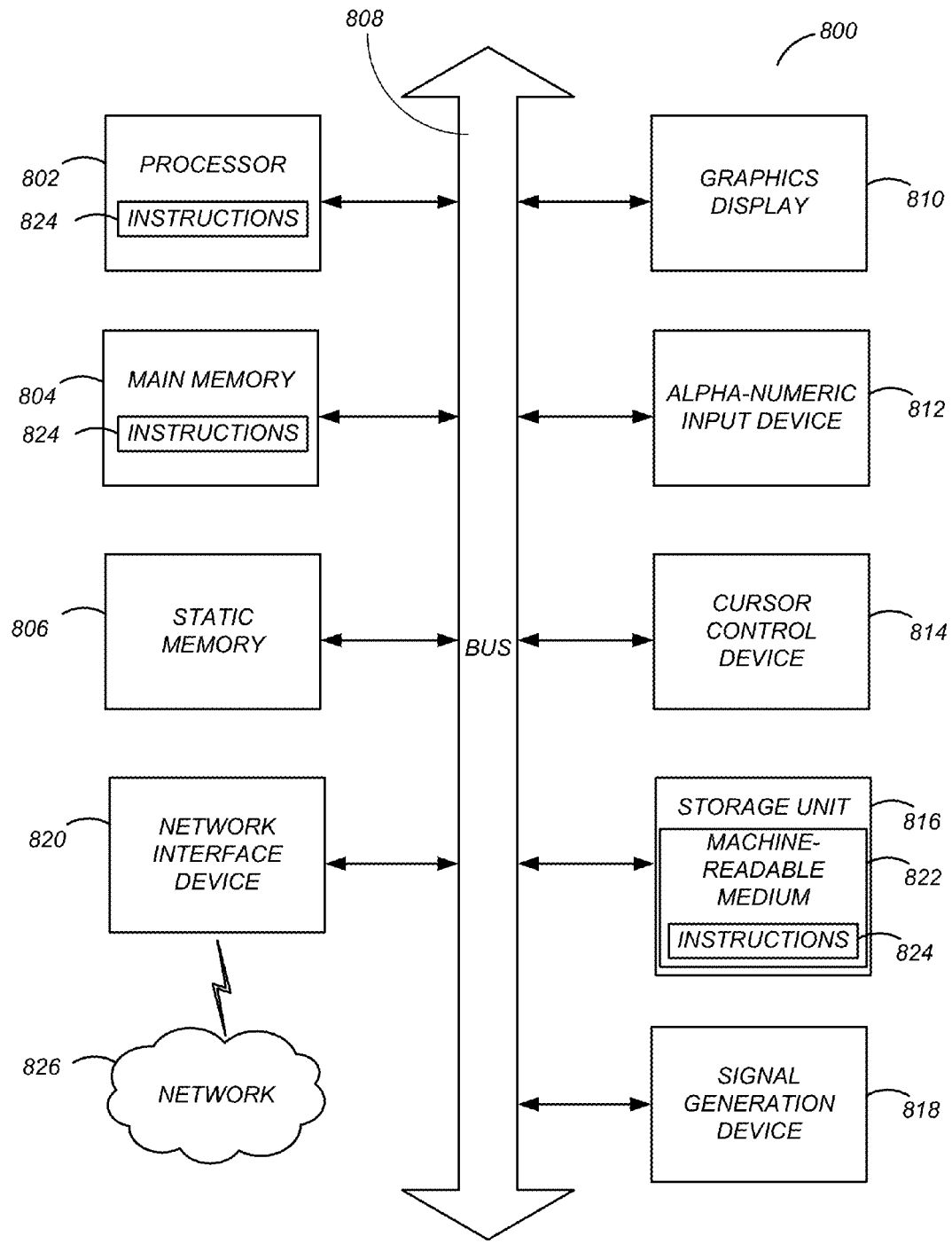
FIG. 8 illustrates one embodiment of components of an example machine able to read instructions from a machine-readable medium and execute them in a processor (or controller).

FIG. 8 is a block diagram illustrating components of an example machine for execution of processes described in FIGS. 5-7 and the modules described in FIGS. 2-4. This machine is an example illustrative of the user clients 100, or the data storage system 102. Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for providing efficient deduplicated data storage. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method comprising:
   accessing, at a server, a dedupe entry in a dedupe database, the dedupe database stored in a first storage, the dedupe entry comprising a reference count and a first checksum, the first checksum computed from a block data entry;
   determining if the dedupe entry satisfies an indexing condition, the indexing condition comprising a comparison of the reference count against a watermark cutoff counter;
   responsive to the dedupe entry satisfying the indexing condition, creating a dedupe index entry, the dedupe index entry comprising a copy of the first checksum, and storing the dedupe index entry in a hyperindex, the hyperindex stored in a second storage;
   receiving a request from a user client to store user data, the request comprising a second checksum computed from at least a portion of the user data, the second checksum equal to the first checksum; and
   responsive to receiving the request, locating the dedupe index entry by matching the second checksum to the copy of the first checksum in the dedupe index entry.

2. The method of claim 1, wherein the first storage comprises at least one selected from the group comprising a hard disk storage system, a solid state drive storage system, or a flash memory storage system.

3. The method of claim 1, wherein the second storage comprises at least one selected from the group comprising random access memory, a solid state drive storage system, or a flash memory storage system.

4. The method of claim 1, wherein the hyperindex comprises a plurality of hyperindex fragments, each hyperindex fragment comprising a dedupe index and a fragment histogram, the dedupe index comprising a plurality of dedupe index entries.

5. The method of claim 4, wherein a histogram is computed from the fragment histograms, and the watermark cutoff counter is computed using information from the histogram.

6. The method of claim 1, wherein the dedupe entry further comprises a dedupe entry identifier.

7. The method of claim 6, further comprising, responsive to locating the dedupe index entry by matching the second checksum to the copy of the first checksum in the dedupe index entry, storing the dedupe entry identifier in an inode entry.

8. The method of claim 7, wherein the inode entry comprises a list of dedupe entry identifiers for dedupe entries that contain checksums computed from portions of the user data.

9. The method of claim 6, further comprising, responsive to locating the dedupe index entry by matching the second checksum to the copy of the first checksum in the dedupe index entry, adding a hold queue entry to a hold queue, the hold queue entry comprising the dedupe entry identifier.

10. The method of claim 9, further comprising accessing the hold queue entry, locating the dedupe entry using the dedupe entry identifier, and incrementing the reference count.

11. A computer for data storage, the computer comprising:
a non-transitory computer-readable storage medium storing executable computer program instructions for:
accessing a dedupe entry in a dedupe database, the dedupe database stored in a first storage, the dedupe entry comprising a reference count and a first checksum, the first checksum computed from a block data entry;
determining if the dedupe entry satisfies an indexing condition, the indexing condition comprising a comparison of the reference count against a watermark cutoff counter;
responsive to the dedupe entry satisfying the indexing condition, creating a dedupe index entry, the dedupe index entry comprising a copy of the first checksum, and storing the dedupe index entry in a hyperindex, the hyperindex stored in a second storage;
receiving a request from a user client to store user data, the request comprising a second checksum computed from at least a portion of the user data, the second checksum equal to the first checksum; and
responsive to receiving the request, locating the dedupe index entry by matching the second checksum to the copy of the first checksum in the dedupe index entry; and
a processor for executing the computer program instructions.

12. The computer of claim 11, wherein the first storage comprises at least one selected from the group comprising a hard disk storage system, a solid state drive storage system, or a flash memory storage system.

13. The computer of claim 11, wherein the second storage comprises at least one selected from the group comprising random access memory, a solid state drive storage system, or a flash memory storage system.

14. The computer of claim 11, wherein the hyperindex comprises a plurality of hyperindex fragments, each hyperindex fragment comprising a dedupe index and a fragment histogram, the dedupe index comprising a plurality of dedupe index entries.

15. The computer of claim 14, wherein a histogram is computed from the fragment histograms, and the watermark cutoff counter is computed using information from the histogram.

16. The computer of claim 11, wherein the dedupe entry further comprises a dedupe entry identifier.

17. The computer of claim 16, further comprising, responsive to locating the dedupe index entry by matching the second checksum to the copy of the first checksum in the dedupe index entry, storing the dedupe entry identifier in an inode entry.

18. The computer of claim 17, wherein the inode entry comprises a list of dedupe entry identifiers for dedupe entries that contain checksums computed from portions of the user data.

19. The computer of claim 16, further comprising, responsive to locating the dedupe index entry by matching the second checksum to the copy of the first checksum in the dedupe index entry, adding a hold queue entry to a hold queue, the hold queue entry comprising the dedupe entry identifier.

20. The computer of claim 19, further comprising accessing the hold queue entry, locating the dedupe entry using the dedupe entry identifier, and incrementing the reference count.

21. A computer-implemented method comprising:
receiving at a server, a request from a client device to store data, the request comprising a request checksum computed from the data;
accessing a hyperindex stored in a first storage, the hyperindex having a plurality of dedupe index entries and each dedupe index entry comprising a stored checksum;
searching the hyperindex for a matching dedupe index entry with a stored checksum equal to the request checksum; and
responsive to not finding a matching dedupe index entry in the hyperindex:
accessing a dedupe database stored in a second storage, the dedupe database comprising a plurality of dedupe entries, and each dedupe entry comprising a stored checksum;
searching the dedupe database for a matching dedupe entry with a stored checksum equal to the request checksum; and
responsive to not finding a matching dedupe entry in the dedupe database, storing the data in a block data store and adding a store queue entry to a store queue, the store queue entry comprising the request checksum.

22. The method of claim 21, wherein the first storage comprises at least one selected from the group comprising a hard disk storage system, a solid state drive storage system, or a flash memory storage system.

23. The method of claim 21, wherein the second storage comprises at least one selected from the group comprising random access memory, a solid state drive storage system, or a flash memory storage system.

* * * * *